Aug. 24, 1926.
F. G. JOHNSON
AIR GAUGE COUPLING
Filed Sept. 1, 1925
1,597,200
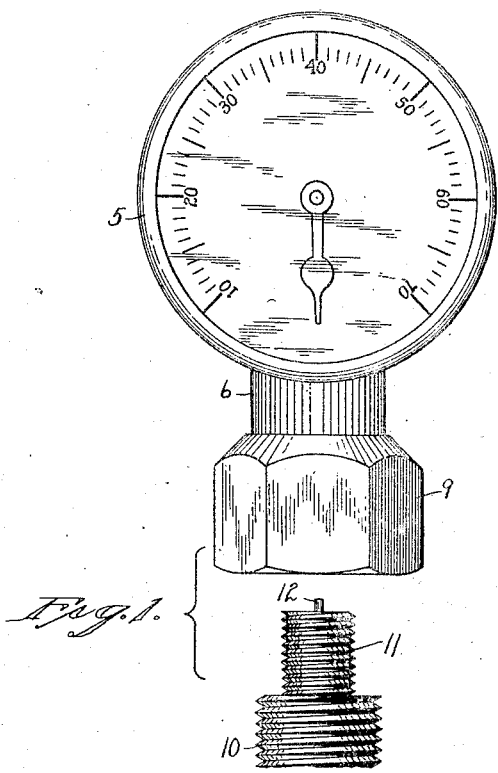
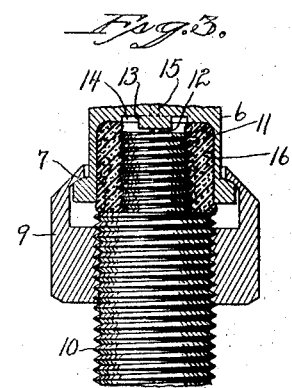
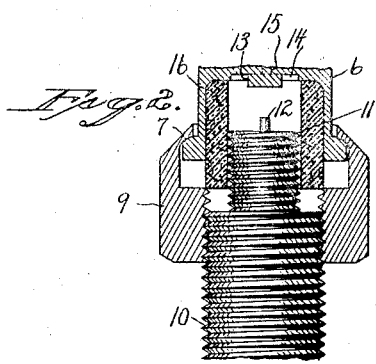
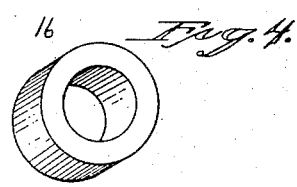
Inventor,
Frederick G. Johnson
by Seymour T. Earle
atty Patented Aug. 24, 1926.

1,597,200

UNITED STATES PATENT OFFICE.

FREDERICK GODFREY JOHNSON, OF NEW HAVEN, CONNECTICUT, ASSIGNOR TO VISIBLE TIRE GAUGE CO., OF NEW HAVEN, CONNECTICUT, A CORPORATION.

AIR-GAUGE COUPLING.

Application filed September 1, 1925. Serial No. 53,792.

I do hereby declare the following, when taken in connection with the accompanying drawings and the characters of reference marked thereon, to be a full, clear and exact description of the same, and which said drawings constitute part of this application, and represent, in—

Fig. 1 a face view, showing an air gauge constructed in accordance with my invention, and as disengaged from a nipple.

Fig. 2 a broken, sectional view of the lower end of the gauge as it is about to be applied to a nipple.

Fig. 3 a similar view, showing the base in its final position of adjustment on a nipple.

Fig. 4 a perspective view of the packing-tubular-washer.

This invention relates to improvement in air gauges particularly adapted for application to the filling nipples of automobile tires, although applicable for other purposes. It is necessary that these gauges should be coupled with the inlet-nipples by an air-tight joint, and the object of this invention is to provide an air-tight joint between the gauge and the nipple to which it is attached, and the invention consists in the construction as hereinafter described and particularly recited in the claims.

In carrying out my invention, I employ an air gauge 5 of usual construction, provided with a base 6 having an annular shoulder 7 for the support of a locking-nut 9 for engagement with the threaded end of a nipple 10. This nipple is provided with an externally-threaded neck 11 above which the stem 12 of a valve extends. The base is formed with a centrally-arranged boss 13, forming a channel 14 around it, and from which a port 15 extends to the gauge mechanism. Within the base is a tubular, rubber packing-ring 16, having an internal diameter which permits the base to easily set over the neck 11, and of a length to seat in the upper end of the base and project beyond the lower edge thereof, so as to seat upon the upper end of the nipple 10.

This permits the gauge to be readily coupled with the nipple 10 by turning the nut 9 thereon, and as the nut 9 is turned down onto the nipple 10, the packing-washer will be compressed longitudinally and expanded transversely, so as to fill the threads in the neck 11 and form an air-tight joint around the neck. As the base is moved down, the boss 13 depresses the valve-stem 12 so as to open the valve and allow air therefrom to pass to the gauge through the port 15, which cannot be obstructed by any action of the packing-washer.

By using a long, tubular packing-washer, not only is an air-tight joint provided, but when it is desired to remove the gauge, the washer will return to its normal position and disengage itself from the threads in the neck 11, so that no difficulty whatever is experienced in either applying or removing the gauge from a nipple.

I claim:

1. In a coupling-member having a base and an annular shoulder at its lower end, and a nut coupled with said shoulder, a threaded nipple with which said nut engages, said nipple formed with an externally-threaded neck, and a straight tubular packing-ring fitting the inside of the base and normally projecting beyond the lower end thereof, surrounding said neck and adapted to be contracted longitudinally and expanded laterally by the downward movement of the nut on the nipple.

2. In a coupling-member having a base provided with an outwardly-projecting annular flange and a nut engaged with said flange, said base recessed and provided at its upper end with a centrally arranged boss, a threaded nipple with which said nut engages, said nipple formed with an externally-threaded neck, and a straight tubular packing-ring fitting the inside of the base and normally projecting beyond the lower end thereof, surrounding said neck and adapted to be contracted longitudinally and expanded laterally by the downward movement of the nut on the nipple.

In testimony whereof, I have signed this specification.

FREDERICK GODFREY JOHNSON.